Aug. 27, 1963

J. E. WALSH 3,101,885

BURST OPEN CONTAINERS

Filed Feb. 19, 1962

Inventor:
John E. Walsh
By his Attorney
Richard A. Wise

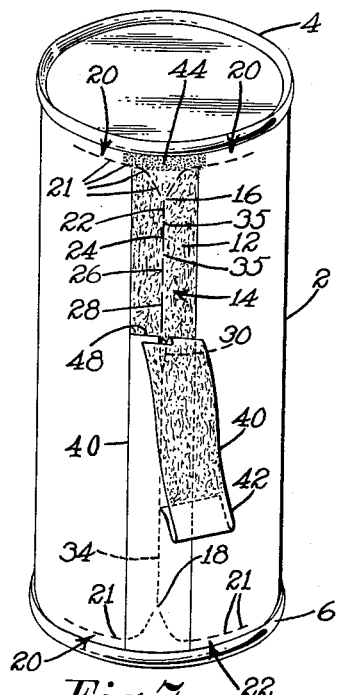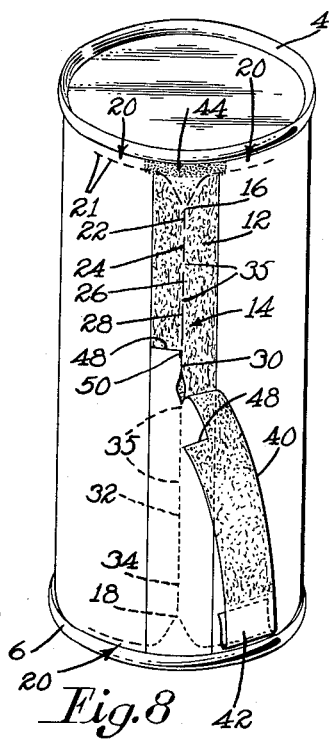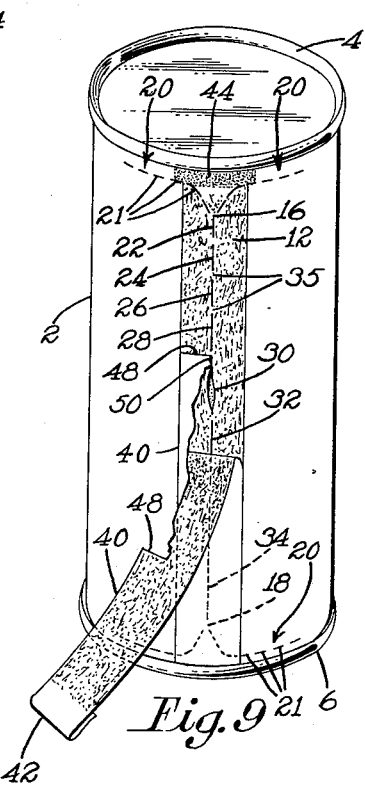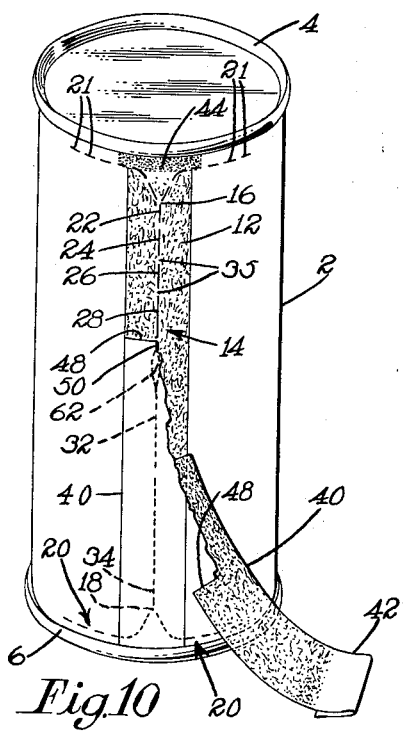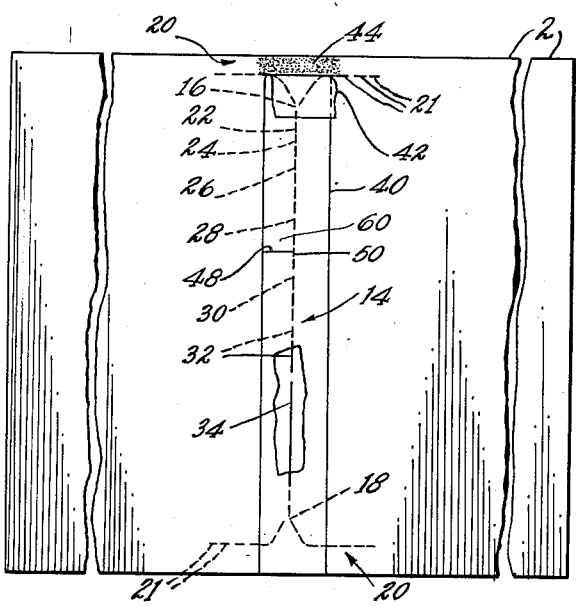

United States Patent Office 3,101,885
Patented Aug. 27, 1963

3,101,885
BURST OPEN CONTAINERS
John E. Walsh, Beverly, Mass., assignor to Safe-Pack Container Co., Minneapolis, Minn., a corporation of Minnesota
Filed Feb. 19, 1962, Ser. No. 173,985
11 Claims. (Cl. 229—51)

This invention relates to quick opening packages and more particularly to burst open containers for pressurized substances. It has particular application to containers for leavened dough preformed into ready-to-bake biscuits, rolls or the like. The invention is directed to a container which is inexpensive to manufacture, easily opened and which does not distort the contents in the process of being opened.

A substantial market has been found for premixed leavened dough for biscuits and the like which are preshaped and packed in tubular containers to be stored under refrigeration until ready for use. When desired, the containers are removed from refrigeration, may, if desired, be allowed to stand at room temperature, opened, and the biscuits then placed in an oven for a short period of baking. The leavened dough, while in the container, is under pressure and it has been found that this pressure can be conveniently utilized as a bursting force for opening the container. However, certain requirements must be met in order to produce a successful container utilizing this principle. One requirement is that the container must not prematurely burst although it must be sufficiently weakened at a predetermined place or places so that it will burst open rapidly at the desired time. Another requirement is that the container must open rapidly over a large area in order to permit the preshaped biscuits to be removed without distortion. Since the biscuits exert pressure on the entire interior surface of the container, if only a small opening is made in the container, as for example, by cutting off one end of the tubular body, the biscuits must be pushed or scooped out. This is obviously undesirable because the biscuits invariably lose their shape.

Numerous attempts have been made to produce tubular containers for leavened dough preshaped into biscuits, which containers are provided with burst-open seams located in their tubular or body portions. While some have been partially successful, none completely satisfy the important requirement that in the process of opening the container, the shape of the preformed biscuits or rolls not be changed or distorted. Distortion often does, however, take place in opening burst-open containers, particularly those which require striking the container to initiate the rupture. Distortion has also been found to take place in the opening of burst-open containers which are provided with helically wound opening seams because to remove all of the biscuits from the container it must be subsequently twisted to unwind the body material from the biscuits.

An attempt to satisfy the above requirements is found in application for United States Letters Patent Serial No. 129,384, filed August 4, 1961, in the name of Clarence O. Karl, in which there is disclosed a container comprising a tubular body weakened for bursting along a predetermined line extending substantially from one end of the container to the other. One portion of the line has a bursting resistance which, without reinforcement, is sufficient to withstand the static internal pressure of the dough. A second portion of the line extends as a continuation of the first portion and has a bursting resistance which is insufficient without reinforcement to withstand the static internal pressure. A reinforcing tape is removably secured to the surface of the container body and overlies at least the second portion of the bursting line. When the tape is removed, the body ruptures from the force of the pressure within and separates along both portions of the weakened line.

While this container has proven to be generally satisfactory it has been found that sometimes the rupturing occurs prematurely in an uncontrolled manner before the tape is fully removed. This results in the person who is opening the can becoming surprised and involuntarily gripping or squeezing the container causing the dough to extrude from the container before it is fully opened and the can body material pulled away from the preformed biscuits. Furthermore, premature rupture before all of the Karl tape is removed results in an inadequate size opening through which the dough will extrude.

One of the objects of this invention is to provide an improved container for preshaped pressurized contents which is readily opened over a large area of its surface without cutting or striking the container and which when once opened, permits the contents to be removed without being squeezed, twisted or otherwise distorted.

Another object of this invention is to provide an improved container for pressurized leavened dough which utilizes the pressure of the dough to rupture the container over a large area of its surface but which will not burst open in an uncontrolled manner.

Still another object of this invention is to provide an improved container for leavened dough which is opened by removing a tape from a weakened bursting line, which will, when the tape is removed, tear along its length rapidly but not with such excessive speed as to explode or otherwise startle the person opening the container.

Another object of this invention is to provide an improved container for leavened dough having a weakened bursting line in its surface and means for controlling the opening of the container by retarding the speed with which the can ruptures along said line.

The reason that the Karl type container, as well as other burst open containers, occasionally rupture and burst very suddenly, as well as occasionally very slowly, is because the internal pressure of the can, i.e. the pressure of the dough, varies over a relatively wide range. While the approximate pressure of a given type of dough under average temperature conditions can be generally predicated, external circumstances can cause the pressure of the same dough to vary. For example, long exposure to high room temperatures after the can has been removed from refrigeration will result in higher internal pressure. Also the recipes and processes from which the leavened dough is made can normally be expected to vary somewhat depending on conditions in different bakeries. Furthermore, at the present time numerous types of bakery products with widely varying recipes are packaged in burst open containers resulting in still wider pressure ranges. Accordingly, the internal pressure, while known generally to fall within an expected range, is unable to be predicated with a constant degree of accuracy. Experiments have determined that the pressure within a container of packaged dough of a given recipe can vary from 10 to 30 p.s.i. However, this range is extended even further with different recipes for the same product and with different types of products.

Another object of this invention is to provide a container for leavened dough having a weakened bursting line in its surface which will rupture and tear at a controlled speed regardless of relatively wide variations in pressure of the dough.

Still another object of this invention is to provide an improved container for leavened dough having a weakened bursting line in its surface provided with a reinforcing tape, which line will rupture when the tape is removed at a location inversely corresponding in strength to the pressure of the leavened dough.

Still another object of this invention is to provide a blank for making a container in accordance with the above objects.

In accordance with these objects and as a feature of this invention there is provided a blank for the formation of a container body, and a body made therefrom, which is weakened for bursting along a predetermined line, the bursting resistance of which varies progressively from end to end. A first portion of the line has a breaking or bursting resistance sufficient to withstand the internal static pressure of the container. A second portion of the line has insufficient breaking or bursting resistance without reinforcement to withstand the internal static pressure of the container and an intermediate portion, between the first and second portions, has a breaking or bursting resistance less than that of the first portion and greater than that of the second. A reinforcing tape is removably secured to the surface of the body and overlies the bursting line. When the tape is removed, the body will rupture in the intermediate or bursting portion and tear along the line toward both ends.

A portion of the width of the tape is weakened for rupture intermediate its ends by an incision or the like extending from one edge inwardly to a point substantially overlying the bursting line whereby when the tape is pulled from the body beginning at one end, the full width of the tape will be removed from the body to the incision and thereafter less than the full width will be removed. Part of the incision in the tape serves to direct the tearing of the tape after the container ruptures. The unremoved portion of the tape serves to retard excessive tearing speed of the can after initial rupture.

The above and other features of the invention including various novel details of construction and combinations of parts will now be more particularly described with reference to the accompanying drawings and pointed out in the claims. It will be understood that the particular containers embodying the invention are shown by way of illustration only and not as limitations of the invention. The principles and features of this invention may be employed in varied and numerous embodiments without departing from the scope of the invention.

In the drawings,

FIG. 7 is a view similar to FIG. 3 of a container having an internal static pressure somewhat less than in the FIG. 3 illustration and at the instant the bursting line has begun to open;

FIG. 8 is a view similar to FIG. 3 of a container having a still lower internal static pressure and at the instant the bursting line has begun to open;

FIGS. 9 and 10 are views of containers whose tapes tear to the left and to the right of the bursting lines, respectively, when pulled below their own rupture lines; and FIG. 11 is a view of a blank from which the container is formed with the reinforcing tape overlying the bursting line and partially broken away.

Figure 1:
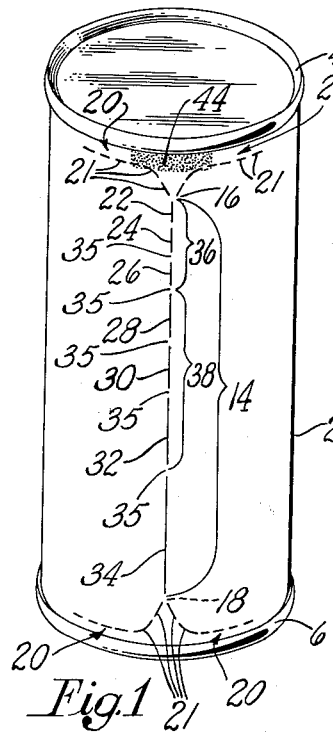
FIG. 1 is a perspective view of a tubular container or can for leavened preshaped biscuits in upright position showing one form of bursting line inscribed in its surface.
Figure 2:
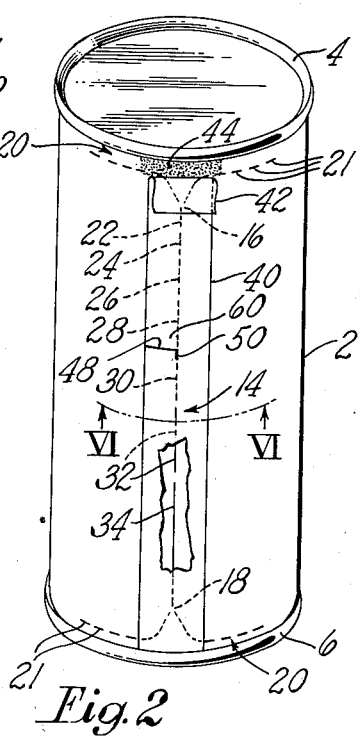
FIG. 2 is a view similar to FIG. 1 with a reinforcing tape overlying the bursting line with a portion of the tape partially broken away.

Referring first to FIGS. 1 and 2, the invention is herein illustrated as embodied in a cylindrical container or can having a body portion 2 which may be formed from a flat blank shown in FIG. 11. Before being formed into a container the blank is substantially rectangular. Ends 4 and 6 of metal or other suitable material close the top and bottom of the body portion 2, respectively, and may be secured in any conventional manner, such as double seaming. The body portion 2 has a conventional longitudinal side seam (not shown in the drawings) which extends from top to bottom. In the illustrative embodiments, the seam would be located on the side of the can which faces away from the viewer.

Figure 6:
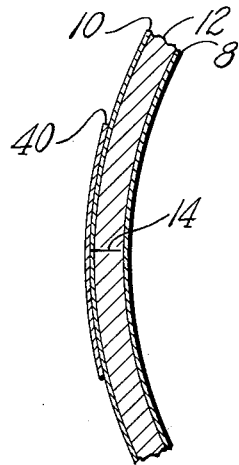
FIG. 6 is a sectional view taken on the line VI—VI of FIG. 2 on a larger scale, showing the construction of one form of container body.

As in the above-identified Karl application, the illustrative body portion 2 of the blank and/or container may be made of laminated material and includes, as herein shown in FIG. 6, a thin inner liquid impervious layer 8 of material, such as aluminum foil which may, if desired, be coated on its interior surface with plastic such as vinyl to prevent contamination between the aluminum and the contents of the can. Another layer of aluminum foil 10, which may be appropriately printed and labeled, forms the outside of the can. Between the layers 8 and 10 is a layer 12 of fibrous material, such as chip board or the like. It will be understood, however, that while the invention hereinafter to be described may conveniently be embodied in a container made of laminated stock it need not necessarily be so constructed. For example, all metal container bodies, all plastic, all fiber, or combinations thereof, may be used as well.

Inscribed in the surface of the body 2 and extending lengthwise thereof substantially from top to bottom edges of the blank shown in FIG. 11 or from end to end of the tubular container body is a longitudinal bursting line 14 (FIG. 1) which begins at a point 16 near the top edge of the can or blank and terminates at a point 18 near the bottom. While the line 14 is herein illustrated as extending parallel with the major axis of the body, it need not be so oriented but may be inclined on a diagonal, be part of a helix, and may be a curved line as well.

Figure 5:
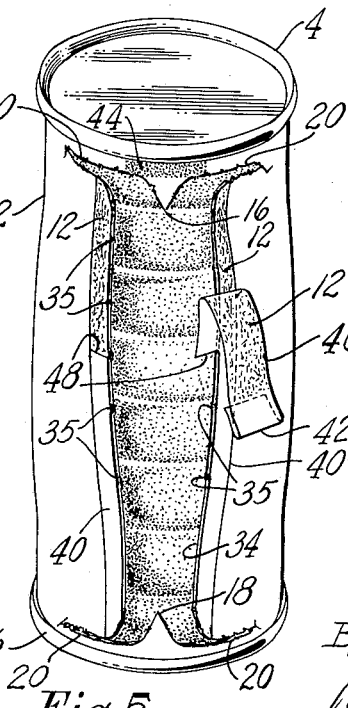
FIG. 5 is a view similar to FIG. 2 showing the container after the body has fully burst open and prior to removal of the biscuits.

The can body also includes prescored lines 20 comprising a plurality of spaced incisions 21 extending from the points 16 and 18 generally towards the ends 4 and 6 and circumferentially of the can. Once the can has ruptured along the line 14 between the points 16 and 18, in a manner hereinafter to be described, it also tears along the lines 20, which also will be called the transverse rupture lines. The transverse tearing of the body along the lines 20 aids in exposing the biscuits located at the ends of the cans (FIG. 5). The transverse rupture lines 20 serve the same purpose and operate in the same manner as those disclosed in the above-identified Karl application even though they are herein described as somewhat greater in length.

The illustrative bursting line 14 comprises a plurality of incisions 22, 24, 26, 28, 30, 32 and 34 which gradually increase in length from the point 16 to the point 18. They are separated by unincised portions or lands 35. The incisions 22 to 34 forming the line 14 are cut into the body almost as deep as, but not through the inner layer 8, to preserve the impervious property of the body (FIG. 6). If liquid seepage through the body or "wicking" as it is sometimes called, is not a consideration, the incisions may be cut all the way through the body material. If "wicking" is a consideration and the incisions do extend completely through the body material, its interior surface may be covered with a tape or coated with plastic, etc. It will also be appreciated that incisions forming line 14 need not be incised in the outer layer 10 of a laminated can but, if desired, may be formed in the middle layer 12 before the body stock is laminated.

The bursting or breaking resistance of the upper or first portion 36 (FIG. 1) of the line 14 comprising the incisions 22, 24 and 26 is sufficient without reinforcement to withstand the internal static pressure of the container, i.e. the pressure of the leavened dough within its expected range.

The bursting or breaking resistance of the lower or hereinafter called the second portion of the line 14, comprising the incision 34, is insufficient without reinforcement to withstand the internal static pressure.

The bursting or breaking resistance of the intermediate portion 38 between the first and second portions and also called the bursting portion, which comprises the incisions 28, 30 and 32, is less than the bursting resistance of the first portion 36 but greater than that of the second portion 34. However, some point along the intermediate or bursting portion 38 is just weak enough to burst when it is not otherwise reinforced.

While the bursting line 14 comprises incisions 22 through 34 of increasing length, the line may be made in numerous ways, as for example, by an interrupted incision of progressively increasing depth or by a line of incised dots gradually increasing in linear spacing, etc. Regardless of its physical construction, it is required that the line be provided with a varying bursting resistance along its length as described above.

Overlying the bursting line 14 is a reinforcing tape 40 adhesively secured to the outer surface of the container body 2. The tape may be of any convenient metal, fiber or plastic material compatible with the other materials from which the can is made. The upper end of the tape 40 extends above the point 16 on the bursting line and there the tape is formed into a loop or tab 42 which may be conveniently gripped between the fingers. Above the point 16 the body 2 may be provided with an adhesive resistant release agent 44 to assure that the tab or loop 42 will not inadvertently adhere to the can. At its opposite end the tape extends downwardly below the point 18 and may lie below the double seamed bottom end 6 which will lend longitudinal rigidity to the can.

Intermediate the ends of the tape 40 and coinciding with the intermediate or bursting portion 38 of the line 14, a transverse incision 48 is made in the tape to weaken it for partial rupture. The incision extends from one edge of the tape, herein shown on the left, substantially to its middle to a point which overlies the line 14. There the incision turns downwardly at right angles a short distance as shown at 50.

Figure 3:
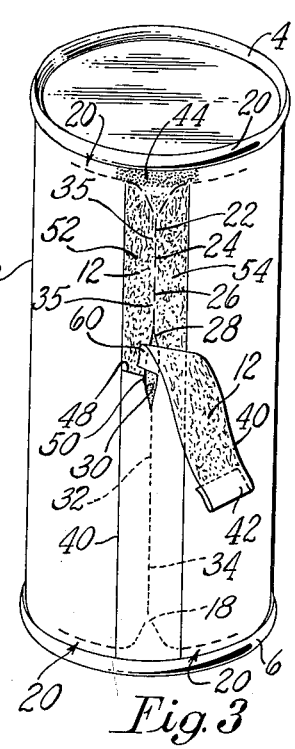
FIG. 3 is a view similar to FIG. 2 in which the reinforcing tape has been pulled from the upper portion of the can and at the instant the bursting line has begun to open under a condition where there is a relatively high static pressure within the can.
Figure 4:
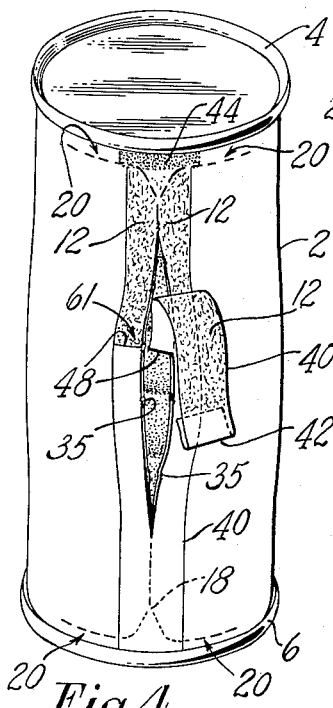
FIG. 4 is a view similar to FIG. 2 in which the bursting of the can is in process.

The opening of a can under one given pressure condition will now be described with reference to FIGS. 3 to 5. It is assumed in this illustrative example that the internal pressure of the can is at the high end of its expected range. The can is gripped and the tape 40 is pulled downwardly from the top 4 and away from the body. It will be noted that part of the outer layer 10 of body material along the marginal areas 52 and 54 (FIG. 3) adjacent the bursting line 14, i.e. the area directly underlying the tape 40, has adhered to the tape and been stripped from the can, tearing with it a layer of the fibrous inner material 12. This will occur when the strength of the adhesive bonding the tape 40 to the can body is stronger than the internal strength of the fibrous material 12. This stripping or peeling is a valuable occurrence since it further weakens the line 14, by delaminating the lands 35 permitting the line 14 to burst more readily. As the tape is removed from the first portion 36 of the line, i.e., the incisions 22, 24 and 26, the can will remain intact because this area of the can has a bursting resistance which even when unreinforced by the tape and delaminated is greater than the internal bursting pressure. As the tape is progressively removed from the intermediate or bursting portion 38 comprising the incisions 28, 30 and 32, initial rupture will occur. Since under this assumed condition the can has a relatively high internal pressure, the initial rupture will occur some place in the upper end of the intermediate or bursting portion 38 and is shown in FIG. 3 as rupturing along the incisions 28 and 30.

Before rupture, the pressure within the can acts to place the lands 35, and the residual portion of the body material below the incisions, as well as the tape 40, in circumferential tension. After rupture a kinetic shearing force develops lengthwise of the bursting line 14. The can bulges (FIG. 4) and immediately begins to tear open in an upward direction progressively along the incisions 26, 24 and 22. Because of the greater strength of the upper portion 36 of the can, the tearing is slower, i.e. less than initial bursting speed and less than the speed at which it would tear if it had ruptured, for example, in an area as weak as the incision 34.

Simultaneously, with the upward tearing the can begins to tear downwardly. The tearing is retarded somewhat by the residual, left-hand portion 60 of the tape lying above the transverse incision 48 which was not initially stripped from the can. Note that the tape was not torn all the way down to the decision when the can ruptured. However, the kinetic shearing force moving downwardly of the bursting line 14 causes the area 60 to become delaminated from the can body as indicated by the arrows at 61 in FIG. 4. The area 61 will delaminate rather than that to the right of the line 14 because the transverse incision 48 in the tape renders ineffective the holding power of the adhesively applied tape on the left-hand side of the line 14 below the incision. In other words, it is only the holding power of the area 60—61 above the transverse incision 48 on the left of the line 14 versus the greater area of the tape adhered on the right-hand side of the line both above and below the incision.

After delamination of the area 60—61 both the can body material and the tape 40 continue to tear downwardly along the line 14 without any more of the tape having to be pulled from the can. The tearing of the tape along the line 14 is initiated by the downwardly extending leg 50 of the transverse incision 48.

Whereas, the lower or second portion 34 of the line 14, when supplemented by the tape 40 has a bursting resistance to tension which is enough to withstand the internal static pressure of the container, once the line 14 has been opened, the then combined tension and shearing forces acting kinetically are sufficient to tear both the tape and the body material completely to the bottom and outwardly along the line 20 as shown in FIG. 5. The presence of the tape serves to retard the tearing somewhat whereby its speed is less than bursting speed. Thus, the end-to-end tearing along the line 14 is more controlled than theretofore found in prior containers, the upward tearing being retarded by the inherent strength of the can body in the upper portion 36 and the downward tearing by the presence of the tape 40.

Another illustrative condition is shown in FIG. 7 in which the internal pressure of the can is insufficient to cause rupture of the seam with portions of the tape remaining adhered to the can above the transverse incision 48 as they were in the prior illustration. Under this condition it is necessary to pull the tape 40 downwardly at least to the slash or transverse incision 48 exposing the incision 28 and part of the incision 30 before the can begins to rupture. Once the can has ruptured the tearing will proceed in the manner described above.

FIG. 8 illustrates a condition wherein there is still less internal pressure whereupon it is necessary to pull the tape 40 from the can to a point below the slash or transverse incision 48 exposing all of the incision 30. Here it will be noted that the tape is peeled from the can below the transverse incision 48 only on the right-hand side of the bursting line 14. The depending leg 50 of the incision 48 directs the tearing of the tape downwardly of the line 14. Once the tape has been removed far enough, i.e. to the incision 30, the bursting resistance is overcome and the line begins to open as shown. Thereafter, the entire line will tear as in the manner described above.

While normally the tape will tear in a substantially straight line downwardly of the line 14 due to the initial assist rendered by the depending leg 50, occasionally the tear will run off the line either to the right or the left as shown, respectively, in FIGS. 9 and 10. This occurs usually as a result of pulling the tape too fast or at an angle relatively to the line 14. FIG. 9 shows the tape 40 peeling off the can to the left exposing the incisions 30 and 32. The removal of the tape will continue until the line 14 ruptures. Occasionally, rupture occurs above the point to which the tape is pulled, again resulting from the tape being removed very rapidly.

The removal of the tape may even continue downwardly of the line 14 until the weakest portion 34 of the line is exposed, whereupon bursting will occur and the tearing of the line will proceed as explained above.

In the event, however, that the tape peels from the can to the right, as shown in FIG. 10, bursting will not occur until the internal pressure is greater than the bursting resistance and delaminates the area 62 of the tape which extends downwardly from the incision 48 on the right-hand side of the bursting line. This condition is similar to that explained with reference to area 60—61 in FIG. 3 above. Here, however, the area of the tape adhering to the left of the line 14 is greater than that adhering to the right of the line. The FIG. 9 and the FIG. 10 conditions are relatively rare occurrences.

It will be appreciated that while the transverse incision 48 has herein been illustrated as a slash or incision extending generally at right angles to the bursting line 14, it may be diagonal or curved or may be a line of small serrations. It, furthermore, may be incised in the tape on the right-hand side of the line 14. While generally it is located substantially midway between the top and bottom of the can it may be located any place coinciding with the intermediate or bursting portion 38 of the line 14. Its location and configuration can be varied depending upon the materials from which the can and tape are made and the pressure range of the contents.

While the initial rupture and tearing of the bursting line 14 have been described for illustrative purposes in a step-by-step process, it will be appreciated that the entire lapse of time from initial rupture to complete opening of the can is in the order of a fraction of a second, whereupon the process may be considered to be for all practical purposes instantaneous.

Having thus described my invention, what I claim as new and desire to secure by Letters Patent of the United States is:

1. A blank for the formation of a container for pressurized contents, said blank having in its surface substantially from edge to edge a line of cleavage weakened for breaking, the breaking resistance of said line varying progressively from end to end, and a reinforcing tape removably secured to the surface of the blank and overlying said breaking line.

2. A blank for the formation of a container for pressurized contents, said blank having in its surface substantially from edge to edge a line of cleavage weakened for breaking, the breaking resistance of said line varying progressively from end to end, a reinforcing tape removably secured to the surface of the blank and overlying said breaking line, and an incision intermediate the ends of the tape extending from one edge of said tape inwardly to a point substantially overlying said breaking line to weaken the width of said tape for partial rupture.

3. A blank for the formation of a container for pressurized contents, said blank having in its surface substantially from edge to edge a line of cleavage weakened for breaking, the breaking resistance of said line varying progressively from end to end, a reinforcing tape removably secured to the surface of the blank and overlying said breaking line, an incision intermediate the ends of the tape extending from one edge of said tape inwardly to a point substantially overlying said breaking line, and a continuation of said incision extending for a short distance substantially in alignment with said line.

4. A container for pressurized preformed contents comprising a tubular body having in its surface substantially from end to end a line of cleavage weakened for bursting, a first portion of said line having a bursting resistance sufficient to withstand the static internal pressure of the container, a second portion of said line having insufficient bursting resistance without reinforcement to withstand the static internal pressure of the container, an intermediate portion between said first and said second portions having a bursting resistance less than that of said first portion and greater than that of said second portion, and a reinforcing tape removably secured to the surface of said body and overlying at least said second and said intermediate portions of the line.

5. A container for pressurized preformed contents comprising a tubular body having in its surface substantially from end to end a line of cleavage weakened for bursting, a first portion of said line having a bursting resistance sufficient to withstand the static internal pressure of the container, a second portion of said line having insufficient bursting resistance without reinforcement to withstand the static internal pressure of the container, an intermediate portion between said first and said second portions having a bursting resistance less than that of said first portion and greater than that of said second portion, a reinforcing tape removably secured to the surface of said body and overlying said line, and means on the tape by which it may be pulled from the container in a direction from said first portion toward said second portion, whereby when the tape is removed to expose, successively, said first and said intermediate portions, the body will rupture in said intermediate portion and tear along said line.

6. A container for pressurized preformed contents comprising a tubular body having in its surface substantially from end to end a line of cleavage weakened for bursting, a first portion of said line having a bursting resistance sufficient to withstand the static internal pressure of the container, a second portion of said line having insufficient bursting resistance without reinforcement to withstand the static internal pressure of the container, an intermediate portion between said first and said second portions having a bursting resistance less than that of said first portion and greater than that of said second portion, a reinforcing tape removably secured to the surface of said body and overlying said line, and means weakening a portion of the width of said tape for partial rupture intermediate its ends, said means coinciding with said intermediate portion of the bursting line.

7. A container for pressurized preformed contents comprising a tubular body having in its surface substantially from end to end a line of cleavage weakened for bursting, a first portion of said line having a bursting resistance sufficient to withstand the static internal pressure of the container, a second portion of said line having insufficient bursting resistance without reinforcement to withstand the static internal pressure of the container, an intermediate portion between said first and said second portions having a bursting resistance less than that of said first portion and greater than that of said second portion, a reinforcing tape removably secured to the surface of said body and overlying said line, and an incision intermediate the ends of said tape extending from one edge to a point substantially overlying said bursting line to weaken said tape for partial rupture.

8. A container for pressurized preformed contents comprising a body having in its surface substantially from end to end a line of cleavage weakened for bursting, a reinforcing tape removably secured to the surface of the body and overlying said line, an incision intermediate the ends of said tape extending from one edge inwardly to a point substantially overlying said bursting line, and a continuation of said incision extending for a short distance substantially in alignment with said line, whereby when the tape is pulled from the body beginning at one end the full width of the tape will be removed from the body from said one end to the incision and thereafter less than the full width will be removed.

9. A container for pressurized preformed contents comprising a tubular body having in its surface substantially from end to end a line of cleavage weakened for bursting, a first portion of said line having a bursting resistance sufficient to withstand the static internal pressure of the container, a second portion of said line having insufficient bursting resistance without reinforcement to withstand the static internal pressure of the container and an intermediate portion between said first and said second portions having a bursting resistance less than that of said first portion and greater than that of said second portion, and a reinforcing tape removably secured to the surface of the body and overlying said bursting line, an incision intermediate the ends of said tape extending from one edge inwardly to a point substantially overlying said intermediate portion of the bursting line, and a continuation of said incision extending for a short distance in substantial alignment with said line.

10. A container for pressurized preformed contents comprising a tubular body having in its surface substantially from end to end a line of cleavage weakened for bursting, a first portion of said line having a bursting resistance sufficient to withstand the static internal pressure of the container, a second portion of said line having insufficient bursting resistance without reinforcement to withstand the static internal pressure of the container, an intermediate portion between said first and said second portions having a bursting resistance less than that of said first portion and greater than that of said second portion, a reinforcing tape removably secured to the surface of the body and overlying said bursting line, means intermediate the ends of said tape weakening said tape for partial rupture, said weakening means coinciding with said intermediate portion of the bursting line, and means on one end of the tape with which it may be pulled from the container to expose successively said first and said intermediate portions of the line whereby the full width of the tape will be removed from the body from said one end to said weakening means and thereafter less than the full width will be removed.

11. A container for pressurized preformed contents comprising a tubular body having in its surface substantially from end to end a line of cleavage weakened for bursting, a first portion of said line having a bursting resistance sufficient to withstand the static internal pressure of the container, a second portion of said line having insufficient bursting resistance without reinforcement to withstand the static internal pressure of the container, an intermediate portion between said first and said second portions having a bursting resistance less than that of said first portion and greater than that of said second portion, a reinforcing tape removably secured to the surface of the body and overlying said bursting line, an incision extending from one edge of the tape inwardly to a point substantially overlying said intermediate portion of the bursting line, a continuation of said incision extending for a short distance substantially in alignment with said line, and means on the end of the tape overlying said first portion of the line with which it may be pulled from the body toward said second portion whereby when the tape is pulled the full width will be removed from said body exposing successively said first and said intermediate portions of the line until said incision is reached and thereafter less than the full width of said tape will be removed.

References Cited in the file of this patent

UNITED STATES PATENTS 2,493,891 McCarty _____ Jan. 10, 1950

FOREIGN PATENTS 48,119 France _____ July 1937